Patented Aug. 17, 1943

2,327,080

UNITED STATES PATENT OFFICE 2,327,080

POLYMERIZATION OF CONJUGATED DIENES

Joseph Frederic Walker, Lewiston, N. Y., assignor to E. I. du Pont de Nemours & Company, Wilmington, Del., a corporation of Delaware No Drawing. Application October 14, 1940, Serial No. 361,113

8 Claims. (Cl. 260—80)

This invention relates to the polymerization of unsaturated compounds, particularly conjugated diene compounds.

Compounds such as butadiene, isoprene, dimethyl butadiene and the like have been polymerized heretofore employing sodium as the polymerizing agent. Generally, polymerization by prior methods using sodium involves carrying out the polymerization reaction in a hydrocarbon medium, e. g. in benzene or toluene, or in diethyl ether. The benzene or diethyl ether functions chiefly as a solvent for the compound being polymerized or as a diluting medium. When polymerizing butadiene by such a method, the product, generally prepared at temperatures approximating the boiling point of the solvent, is usually a rubber-like product.

It is an object of my invention to provide a new and improved method of polymerizing certain conjugated diene compounds in the presence of an alkali metal. A further object is to produce improved solvents for use in carrying out polymerization of such compounds in the presence of alkali metal, whereby polymerization is facilitated and the extent of polymerization may be more readily controlled. Still further objects will be apparent from the ensuing description of the invention.

The above objects are accomplished in accordance with my invention by subjecting a conjugated diene, as hereinafter defined, to the action of an alkali metal in the presence of certain ether solvents. I have found that certain classes of ethers have a very specific effect in promoting the polymerization reaction in the presence of an alkali metal. Although the action of these solvents appears to be specific, I do not know whether their action is catalytic, whether the solvent itself takes part in the reaction in some manner, or whether there are some solubility or other physical factors involved. There are some indications that use of the present ethers causes, for example, sodium to react to a substantial extent with the conjugated diene and it is possible that the product resulting from that reaction is more effective than metallic sodium in causing polymerization of the diene to occur. Regardless of the proper explanation as to the mode of action of these solvents, I have found that they very definitely promote the polymerization reaction and in general permit carrying out the polymerization at relatively low temperatures. They also facilitate controlling the extent of polymerization.

Although the solvents which I have found to be suitable for the present purpose are all ethers, I have discovered that only certain types or classes of ethers are suitable. In general, three specific classes of ethers may be used in accordance with my invention. These classes of ethers are:

1. Saturated, aliphatic, acyclic monoethers having a CH₃O-group and having an oxygen to carbon ratio of not less than 1:4. Examples of such ethers are dimethyl ether, methyl ethyl ether, methyl propyl ether, and methyl isopropyl ether.

2. Saturated aliphatic, acyclic, polyethers having not more than one ether oxygen attached to any one carbon atom. Examples of this class of ethers are ethylene glycol dialkyl ethers, such as ethylene glycol dimethyl ether, ethylene glycol methyl ethyl ether, ethylene glycol methyl propyl ether, and the like. Other ethers of this class are glycerol trimethyl ether, glycerol methyl diethyl ether, glycerol triethyl ether and diethylene glycol dimethyl ether.

3. Certain dialkylamino ethers. I have discovered that certain dialkylamino derivatives of the ethers of the above classes 1 and 2 are effective solvent media for the present purposes. The dialkylamino ethers which promote the polymerizing action of alkali metals in accordance with the present invention are those in which the alkyl radicals in the dialkylamino group contain not more than three carbon atoms each, for example, the dimethyl-, diethyl-, methyl propyl-, and dipropyl-amino derivatives of the above ethers. The dialkylamino group may occupy any position in the ether molecule providing that there are not more than two carbon atoms between the amino nitrogen atom and the ether oxygen atom. In other words, the tertiary amino ether must contain the grouping

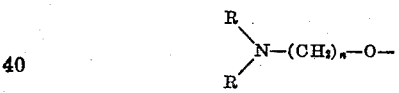

wherein R is an alkyl group containing not more than three carbon atoms and $n$ is the integer 1 or 2. Examples of such ethers are:

(CH₃)₂N—CH₂—O—CH₃ (Dimethylamino dimethyl ether)
(CH₃)₂N—C₂H₄—O—CH₃ (Dimethylaminoethyl methyl ether)
(C₂H₅)₂N—C₂H₄—O—CH₃ (Diethylaminoethyl methyl ether)
(CH₃)₂N—C₂H₄—O—C₂H₄—O—C₂H₅ (Dimethylaminoethyl ethyl ether of ethylene glycol)
(CH₃)₂N—C₂H₄—O—C₂H₄—O—C₂H₄—N(CH₃)₂ (Dimethylaminoethyl diether of ethylene glycol)

In addition to the above tertiary amino derivatives of the ethers of groups 1 and 2, I have found that certain tertiary amino derivatives of ethers not included in groups 1 and 2 have a promoting action upon the polymerization period.

Thus dialkylamino derivatives of diethyl ether and ethyl propyl ether, which derivatives include the tertiary amino group as defined in the foregoing paragraph, are effective. However, the parent ethers, i. e. diethyl ether and ethyl propyl ether, are ineffective for the present purpose. The rule stated previously that these amino ethers may not contain more than two carbon atoms between the nitrogen and oxygen atoms also holds for these ethers. Also, if the ether is a mono-ether it must not contain more than 7 carbon atoms, including the carbon atoms in the dialkyl-amino group. If the ether is a polyether, the ratio of the total carbon atoms to the sum of the ether oxygen atoms and amino nitrogen atoms present must not be greater than 5:1. A further requirement which must be met in order that a dialkyl amino ether may be useful for the present purpose is that any alkylene group present in the ether, which group is not attached to a nitrogen atom, must contain not more than three carbon atoms.

In general, the dialkylamino ethers which may be used in accordance with this invention may be defined as those saturated, aliphatic, tertiaryamino mono- and poly-ethers which contain at least one group represented by the formula

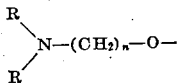

wherein R is an alkyl group having not more than three carbon atoms and $n$ is the integer 1 or 2, the monoethers included in the group being those which have not more than seven carbon atoms, and the polyethers being those in which the ratio of carbon atoms to the sum of the nitrogen and ether oxygen atoms present in the molecule is not greater than 5:1, any alkylene group present in such mono- or poly-ether, which group is not attached to a nitrogen atom, containing not more than three carbon atoms.

It should be understood that the ethers included within the above three groups as defined must not contain reactive groups, such as carboxyl, hydroxyl, or primary or secondary amino groups or the like, which react readily with alkali metals. In other words, the ethers should be substantially non-reactive towards alkali metals. By this I do not mean that the ethers may not react in some reversible manner with the alkali metal or with the compound being polymerized, since there are some indications that the above ethers may, to some extent, take part in the reaction. However, the ether must not be broken up or form irreversible reaction products to any appreciable extent. A slight irreversible action may take place without substantial loss of the ether or without substantially reducing the amount of alkali metal present in the reaction mixture. The ethers which are suitable within the scope of my invention are in effect "inert," although as noted they may play some active role in causing the reaction to proceed. In contrast to other ethers, such as ordinary diethyl ether, the present ethers may be termed "effective" ethers in that they definitely promote the polymerization reaction.

While I prefer to use the present "effective" ethers or mixtures thereof alone as reaction media, they may be diluted, if desired, with various ineffective materials, such as benzene, toluene, diethyl ether and the like, which materials do not react with alkali metals and are themselves not suitable for use alone as solvents in practicing the present invention. The effect of diluting the present ethers with materials such as benzene or diethyl ether is usually to decrease the rate of polymerization. In general, as the concentration of the ether is decreased, a minimum concentration is reached, below which the ether will have no practical promoting effect. This minimum concentration will vary for the various ethers and with reaction conditions such as temperature, concentration of the conjugated diene compound in the reaction medium, etc. Accordingly, the concentration of the effective ether in the reaction mixture should be sufficient to have a substantial promoting effect upon the polymerization reaction.

I have discovered that the present ethers are valuable for use as reaction media in processes for effecting the polymerization in the presence of alkali metals of certain conjugated diene compounds, which compounds are:

1. Acyclic conjugated dienes. Illustrative of this class are butadiene, isoprene, dimethyl butadiene and the like.

2. Monocyclic conjugated dienes. Illustrative of this class are 1,2-dihydrobenzene and cyclopentadiene. Included in this group are monocyclic compounds in which the conjugated diene group occurs either wholly within or without the cyclic portion of the molecule. Compounds in which one double bond of the conjugated system occurs within the cyclic portion of the molecule and the other double bond occurs outside of the cyclic portion of the molecule are also included. Throughout the specification and in the appended claims, the term "monocyclic conjugated dienes" is used to include only compounds whose molecular structure includes a conjugated arrangement of double bonds, i. e. the grouping

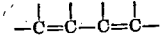

positioned wholly outside of any aromatic ring structure. As used, the term excludes compounds such as benzene and styrene, but includes compounds such as 1,2-dihydrobenzene and cyclopentadiene.

Various derivatives of the above acyclic and monocyclic conjugated diene hydrocarbons are to be considered as included within the scope of the present invention, provided such derivatives do not react with the alkali metal, or if such reaction does occur, the rate of reaction is substantially less than the rate of polymerization. Thus, halogen and cyanogen derivatives of butadiene may be polymerized by the present method, even though the halogen or cyanogen group may react to some extent with the alkali metal. In particular, chloroprene and alpha-cyanoprene may be polymerized although in those instances the yield of polymerization product is not as satisfactory as when the unsubstituted diene hydrocarbon is polymerized. Derivatives containing carboxy, hydroxy, and ester substituent groups are definitely excluded from the group of compounds that may be polymerized successfully by the present method. Compounds containing such groups react too rapidly with the alkali metal.

In specifying that the diene compound should not be reactive towards the alkali metal, I do not mean that it may not react to form some alkali metal addition compound which may promote polymerization. Indications are that some such addition compound is formed to a substantial extent and it is quite possible that the value of the present ethers in promoting polymerization is due largely to their facilitating the formation of such addition products. The present method is particularly useful in effecting polymerization of compounds such as butadiene and 1,2-dihydrobenzene and simple alkyl substituted derivatives of those compounds.

Mixtures of the above diene compounds may also be polymerized by the present method. The diene compounds may be used in substantially pure form or in relatively impure form. Thus, butadiene obtained in petroleum cracking processes, although relatively impure, may be polymerized successfully by the present method to give an oil which has good drying properties.

The present invention is further illustrated by the following examples.

Example 1

Sixty-five grams of butadiene dissolved in 250 cc. of ethylene glycol dimethyl ether were treated with 3.25 grams of freshly-cut pieces of sodium. During the reaction, the mixture was agitated and maintained under a nitrogen atmosphere at a temperature of about 0° C. After three hours of agitation, the excess sodium was removed and a small amount of water was added to decompose active sodium compounds formed. Carbon dioxide was then passed through the mixture to convert the sodium hydroxide formed to sodium bicarbonate, the latter being then filtered from the mixture. The filtrate was distilled at reduced pressure to separate the ether solvent. A polymerization product in the form of a clear, water-white, viscous oil remained as residue. In several experiments carried out substantially as described, the polymerization product was obtained in amounts corresponding to yields ranging from 70 to 95% of the theory.

Example 2

Ten grams of isoprene dissolved in 50 cc. of ethylene glycol dimethyl ether were polymerized at a temperature of 20–30° C. during the course of three hours in the presence of 2.5 grams of sodium. The method employed was essentially the same as that described for Example 1. There was obtained a polymerization product in the form of a viscous oil in an amount corresponding to 54% of the theory.

Example 3

Ten grams of alpha-cyanoprene dissolved in 50 cc. of ethylene glycol dimethyl ether were polymerized in the presence of 2.5 grams of sodium at a temperature of 20–30° C. during the course of three hours. The general method employed was the same as that described in Example 1. There was recovered a viscous oil in an amount corresponding to 25% of the theory.

Example 4

Ten grams of 1,2-dihydrobenzene were dissolved in 50 cc. of ethylene glycol dimethyl ether and agitated at a temperature of 20–30° C. for three hours in the presence of 2.5 grams of sodium. There was recovered, using the method employed in Example 1, 4.2 grams of a polymerization product, which corresponded to a yield of 42% of the theory. The product was a viscous amber oil. On exposure to the rays of a sun lamp, a film of this oil dried to give a tack-free film in approximately 4 hours.

Example 6

Ten grams of chloroprene dissolved in 50 cc. of ethylene glycol dimethyl ether were polymerized at 20–30° C. in the presence of 2.5 grams of sodium. A viscous oily polymer corresponding to a yield of 26% was isolated from the reaction mixture.

While I have illustrated my method in the foregoing examples using only ethylene glycol dimethyl ether as solvent, other ether solvents included in the classes of ethers defined hereinabove may be used successfully. Some of these ethers are more suitable than others. Of the three classes of ethers indicated, the acyclic polyethers generally give the best results, although good results may also be obtained with ethers of the other two classes, particularly the acyclic monoethers such as dimethyl ether. My preferred ether solvent is ethylene glycol dimethyl ether.

I have discovered that in using the present ether solvents, various factors may influence the degree to which the conjugated diene compounds are polymerized. Thus, factors such as temperature, time of reaction, concentration of the diene compound in the reaction mixture, have distinct effects upon the degree of polymerization. By suitably adjusting such factors, it is possible to practice the present method so as to effect controlled polymerization.

I have found that in general, the degree of polymerization varies inversely with the temperature at which polymerization is effected. Thus, in one series of experiments carried out using ethylene glycol dimethyl ether as solvent in polymerizing butadiene and varying only the temperature at which polymerization was effected, it was found that at temperatures of 0, 20, and 50° C., the molecular weights of the polymerization products obtained were roughly 1500–2000, 900–1200, and 600–800, respectively.

The degree of polymerization is also affected by the reaction time. In general, the longer the reaction time the larger will be the molecular weight of the polymerization product. In a series of experimental tests carried out employing ethylene glycol dimethyl ether as the solvent medium for polymerizing butadiene in the presence of sodium, the reaction time was varied from ½ to 2 hours while keeping all other factors constant. With reaction times of ½, 1 and 2 hours, the molecular weights of the polymerization product resulting were 1600, 1800 and 2340, respectively. While these results indicate that the molecular weight increases as the time of reaction is increased, it is a general rule that with butadiene, polymerization never proceeds to such an extent that true solid reaction products result. Regardless of the length of time employed, I have found that the product of the reaction in the case of butadiene is generally a highly viscous oil.

The concentration of the diene compound in the reaction mixture also has an influence upon the degree of polymerization. In the case of butadiene, the greater the dilution, i. e. the lower the concentration of butadiene in the mixture, the lower the molecular weight of the product. In a series of experiments using ethylene glycol dimethyl ether at solvent to butadiene ratios of 1:1, 2:1, and 5:1, the molecular weights of the reaction products were 1490, 1100 and 735, respectively. All of these tests were carried out at 0° C. during a reaction time of 1 hour.

As a general rule the products obtained by practicing the present process are viscous oils which have excellent drying properties and may therefore be used in coating and lacquer compositions. This is particularly true of the product obtained from butadiene.

One particular advantage attending the use of the present ethers is that the polymerization reaction may be effected at low temperatures. Temperatures as low as about $-50°$ C. and up to as high as about the boiling point of the solvent may be used. As a general rule I prefer to employ temperatures at which the diene will not distill from the reaction mixture. With butadiene, temperatures of about $-10$ to $0°$ C., and with other dienes, temperatures of the order of 20 to $30°$ C. are preferred. The choice of temperature, however, will be governed to a certain extent by the type of product desired since temperature has an effect upon the degree of polymerization.

While the specific examples herein included have shown only the use of sodium as polymerization agent, other alkali metals such as potassium and lithium may be used effectively. Sodium is preferred, however, since it is more readily available and is cheaper than are the other alkali metals.

Many widely different embodiments of this invention may be made without departing from the spirit and scope thereof. Accordingly, the invention is not to be limited by the foregoing description and examples, which are intended to be illustrative only, except as indicated in the appended claims.

I claim:

1. The process of claim 8 wherein the ether employed is an ethylene glycol dialkyl ether.

2. The process of claim 8 wherein the ether employed is ethylene glycol dimethyl ether.

3. The process comprising subjecting butadiene to the polymerizing action of sodium in the presence of a saturated, aliphatic, acyclic polyether having not more than one ether oxygen atom attached to any one carbon atom.

4. The process comprising subjecting butadiene to the polymerizing action of sodium in the presence of an ethylene glycol dialkyl ether.

5. The process of claim 4, wherein the ether employed is ethylene glycol dimethyl ether.

6. The process comprising subjecting 1,2-dihydrobenzene to the polymerizing action of sodium in the presence of ethylene glycol dimethyl ether.

7. The process which comprises subjecting a conjugated diene compound selected from the group consisting of butadiene, isoprene, dimethyl butadiene, chloroprene, alpha-cyanoprene, 1,2-dihydrobenzene and cyclopentadiene to the polymerizing action of an alkali metal in the presence of a saturated, aliphatic, acyclic polyether having not more than one ether oxygen attached to any one carbon atom.

8. The process which comprises subjecting a conjugated diene compound selected from the group consisting of butadiene, isoprene, dimethyl butadiene, chloroprene, alpha-cyanoprene, 1,2-dihydrobenzene and cyclopentadiene to the polymerizing action of sodium in the presence of a saturated, aliphatic, acyclic polyether having not more than one ether oxygen attached to any one carbon atom.

JOSEPH FREDERIC WALKER.